UNITED STATES PATENT OFFICE.

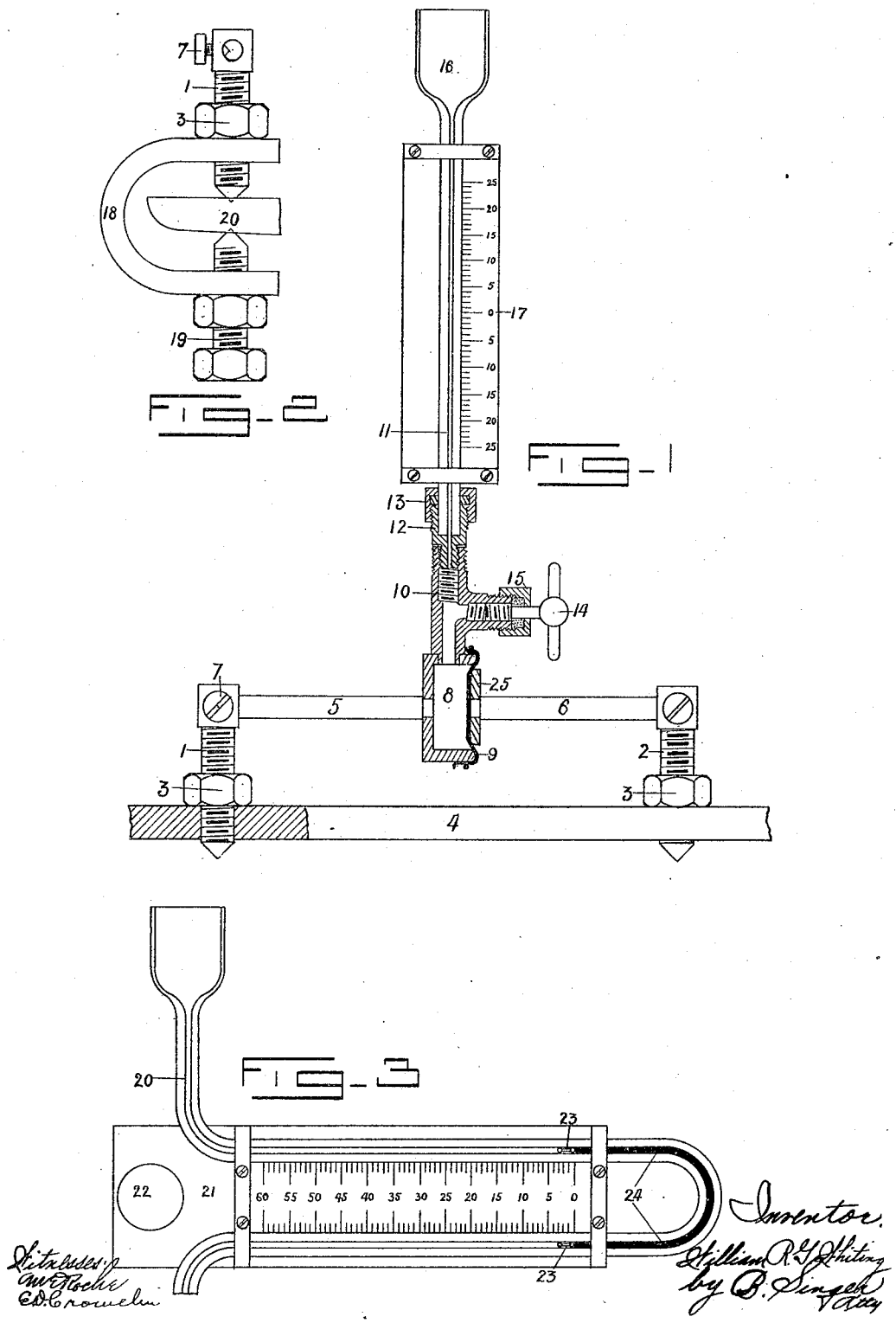

WILLIAM ROBERT GERALD WHITING, OF FENHAM, NEWCASTLE-UPON-TYNE, ENGLAND.

STRAIN-INDICATOR.

1,125,236.  Specification of Letters Patent.  Patented Jan. 19, 1915.

Application filed January 26, 1912. Serial No. 673,558.

*To all whom it may concern:*

Be it known that I, WILLIAM ROBERT GERALD WHITING, of Fenham, Newcastle-upon-Tyne, in the county of Northumberland, England, have invented certain new and useful Improvements in Strain-Indicators, of which the following is a specification.

This invention relates to the measurement of the strain which an elastic material undergoes when subjected to stress and has for its object the measurement of the amount of the said strain.

The principle employed is the combination of a small bore tube communicating with a cylinder full of liquid, whereby a small diminution in the volume of the cylinder produces a large relative motion of the column of liquid in the tube. This principle has been applied to micrometer gages and the like instruments, and to measure a force acting on the aforesaid cylinder, and to measure the extension of a spring by measuring the liquid expelled from a dash-pot in communication with and a component part of the apparatus of which the spring is a part. The direct application of this principle to a strain indicator, which may be attached to any material or structure in order to ascertain the extent of any physical strain that occurs between any two points in that material or structure, is the object of the present invention, as well as the particular arrangement of the apparatus described in the following paragraphs.

The arrangement consists of a cylinder of which one end is solid and the other is closed by an elastic membrane of india rubber, metal or other elastic material. Into the cylinder a small bore transparent tube is inserted. In contact with the membrane, but not rigidly attached thereto is a plunger. The two component parts of the arrangement, namely the cylinder and the plunger, are rigidly fastened to two points in the material of which the strain is to be indicated. The cylinder is filled with a suitable liquid and on any motion of the two points relatively to one another occurring the column of liquid in the small bore tube rises or vice-versa indicating on a very much magnified scale the motion of the two points.

The small bore transparent tube may be arranged similarly to a maximum and minimum thermometer for the purpose of recording extreme momentary stresses. Two or more sets of apparatus as above may be combined to determine the position of the neutral axis of the material under observation.

Suitable choice of the materials of the cylinder liquid and other parts of the apparatus may be made to form an automatic compensation for variations of temperature.

Referring to the drawings Figure 1 shows one form of the apparatus, partly in section. In this arrangement two screwed pillars 1, 2 provided with lock nuts 3, 3 are screwed into holes drilled at suitable distances in the material or structure 4 to be tested. Holes are drilled in the head of each pillar to receive the rods 5 and 6 which are free to slide in these holes but are secured in any desired position by means of the set screws 7, 7. Upon the extremity of the rod 5 is rigidly secured the cylinder 8 which is closed at one end by means of the elastic membrane 9. The cylinder 8 is in communication with the interior of the T piece 10. One arm of the T piece communicates with the bore of the glass tube 11 which is secured to it by means of the adapter 12 and gland 13. An adjusting screw 14 works in the other arm of the T piece through the gland 15. The glass tube 11 is provided with a funnel 16, and secured to the tube is a suitable scale 17.

When it is desired to use the instrument in a vertical position the arrangement as shown may be modified by interchanging the adapter 12 with the adjusting screw 14 and gland 15. Upon the extremity of the rod 6 is rigidly secured the plunger 25 which bears against, but is not attached to the membrane 9.

Fig. 2 shows an alternative method of attaching the pillars to the material under test where it is not possible or convenient to drill holes in the material. In this case the pillar 1 is screwed through a clamp 18 of suitable size and provided with a screw 19 which can be tightened up against the material 20 under test in opposition to the pillar 1.

Fig. 3 shows a form which the glass tube may take when it is desired to register the limits of strain during momentary stresses. The glass tube 20 is bent into a U shape with two horizontal limbs and the scale 21 is arranged to slide horizontally upon the glass tube. The scale may be extended and may carry a counterweight 22 to balance the weight of the U tube.

23, 23 are two light steel indices provided with light steadying springs as used in registering thermometers of the maximum and minimum type. Between the two indices and extending normally around the bend of the U tube is a column of mercury or other suitable liquid, 24.

The method of using the instruments is as follows: The two pillars are secured to the material under test at a predetermined distance apart either by drilling and tapping holes as in Fig. 1, by use of a clamp as in Fig. 2 or by other suitable means. The distance apart at which the pillars are fixed is determined in each case according to the anticipated magnitude of the strain. For a given strain the displacement of the liquid in the glass tube will vary as the distance apart of the two pillars. In the case of the instrument shown in Fig. 1 colored water or other suitable liquid is introduced by means of the funnel 16. The rods 5 and 6 are so adjusted as to put a slight tension upon the membrane 9 and the column of liquid is then adjusted to the zero point by means of the adjusting screw 14 and the sliding scale 17. In the case of the instrument shown in Fig. 3 colored water, alcohol or other suitable liquid is introduced as above. One of the steel indices 23 is then inserted, then a measured quantity of mercury and afterward the second index. More of the first liquid may be introduced into the tube above the mercury. By means of the screw 14 and the sliding scale the two indices are adjusted to the zero points. A small steel magnet may be used to bring the indices to the ends of the mercury column.

When the material is subjected to the intended system of loading the resulting strain will obviously alter the relative positions of the two pillars thus causing the liquid to rise or fall in the tube. In the case of the glass tube shown in Fig. 3 the steel indices will remain in the extreme positions reached, and will register the limits of the strain.

By experiment a constant may be obtained for each instrument.

What I claim and desire to secure by Letters Patent is:

1. A strain indicator comprising separated pillars, means for connecting said pillars to the material to be tested, an open ended cylinder associated with a graduated liquid gage containing a liquid, a screw adjusting the position of the liquid in the gage, a bar connecting said cylinder with one of said pillars, an elastic membrane closing the open end of said cylinder, a plunger abutting and operating against said elastic membrane, a bar connecting said plunger with the pillar remote from that to which the open ended cylinder is connected, and means adapted to be set at the end of the column of mercury in said gage for maintaining a column of mercury, substantially as specified.

2. A strain indicator comprising separated pillars, means for connecting said pillars to the material to be tested, an open ended cylinder associated with a graduated liquid gage containing a liquid, said gage adapted to contain a column of mercury, steel indices adapted to be set at the end of the column of mercury in said gage and adjacent the liquid, said indices being provided with steadying springs, a bar connecting said cylinder with one of said pillars, an elastic membrane closing the open end of said cylinder, a plunger abutting and operating against said elastic membrane, a bar connecting said plunger with the pillar remote from that to which the open ended cylinder is connected, substantially as specified.

In testimony whereof I affix my signature in presence of two witnesses.

WILLIAM ROBERT GERALD WHITING.

Witnesses:
HAROLD BEECH,
FRED H. DUKE.

Copies of this patent may be obtained for five cents each, by addressing the "Commissioner of Patents, Washington, D. C."